United States Patent
Aiba

(10) Patent No.: US 10,071,633 B2
(45) Date of Patent: Sep. 11, 2018

(54) CONTROL DEVICE FOR ELECTRIC VEHICLE

(71) Applicant: MITSUBISHI JIDOSHA KOGYO KABUSHIKI KAISHA, Tokyo (JP)

(72) Inventor: Noriyoshi Aiba, Toyota (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/176,821

(22) Filed: Jun. 8, 2016

(65) Prior Publication Data
US 2016/0362003 A1 Dec. 15, 2016

(30) Foreign Application Priority Data

Jun. 9, 2015 (JP) ................................. 2015-116944

(51) Int. Cl.
*B60L 3/00* (2006.01)
*B60L 15/20* (2006.01)
(Continued)

(52) U.S. Cl.
CPC ............ *B60L 3/0023* (2013.01); *B60K 6/442* (2013.01); *B60L 1/02* (2013.01); *B60L 3/00* (2013.01); *B60L 3/003* (2013.01); *B60L 3/0046* (2013.01); *B60L 3/0061* (2013.01); *B60L 3/0084* (2013.01); *B60L 3/12* (2013.01); *B60L 11/123* (2013.01); *B60L 11/14* (2013.01); *B60L 11/1874* (2013.01); *B60L 15/20* (2013.01); *B60W 20/50* (2013.01); *B60W 50/0097* (2013.01); *B60W 50/038* (2013.01); *H02P 6/08* (2013.01);
(Continued)

(58) Field of Classification Search
CPC ..................................................... B60L 3/0023
See application file for complete search history.

(56) References Cited

U.S. PATENT DOCUMENTS 8,336,523 B2 * 12/2012 Kasbauer ................ B60L 3/06
123/396

FOREIGN PATENT DOCUMENTS

EP 0 768 204 A1 4/1997
EP 1 153 783 A2 11/2001
(Continued)

OTHER PUBLICATIONS

Extended European Search Report dated Oct. 13, 2016 in corresponding European Patent Application No. 16173374.6.

*Primary Examiner* — Anne Marie Antonucci
(74) *Attorney, Agent, or Firm* — Birch, Stewart, Kolach & Birch, LLP

(57) ABSTRACT

A control device for an electric vehicle including a traveling motor which is configured to transmit a driving force to driving wheels, includes: a control unit having a suppression mode function for suppressing a traveling state amount of the vehicle when an abnormality occurs in an electrically driven system of the vehicle. The suppression mode function includes a first suppression state and a second suppression state, and a suppression degree in the second suppression state is smaller than a suppression degree in the first suppression state. In accordance with a kind of the abnormality in the electrically driven system, the control unit is configured to cause the vehicle to be in the first suppression state or is configured to cause the vehicle to be in the first suppression state after causing the vehicle to be in the second suppression state.

7 Claims, 4 Drawing Sheets

(51) Int. Cl.
- *B60K 6/442* (2007.10)
- *H02P 6/08* (2016.01)
- *B60L 1/02* (2006.01)
- *B60L 3/12* (2006.01)
- *B60L 11/12* (2006.01)
- *B60L 11/14* (2006.01)
- *B60L 11/18* (2006.01)
- *B60W 50/00* (2006.01)
- *B60W 50/038* (2012.01)
- *B60W 20/50* (2016.01)
- *F02D 41/22* (2006.01)
- *B60W 50/029* (2012.01)
- *B60W 50/14* (2012.01)

(52) U.S. Cl.
CPC ....... *B60L 2240/12* (2013.01); *B60L 2240/14* (2013.01); *B60L 2240/423* (2013.01); *B60L 2240/425* (2013.01); *B60L 2240/443* (2013.01); *B60L 2240/507* (2013.01); *B60L 2240/545* (2013.01); *B60L 2240/80* (2013.01); *B60L 2250/16* (2013.01); *B60L 2250/26* (2013.01); *B60W 2050/0292* (2013.01); *B60W 2050/146* (2013.01); *B60W 2720/10* (2013.01); *B60W 2720/30* (2013.01); *F02D 2041/227* (2013.01); *Y02T 10/6217* (2013.01); *Y02T 10/6234* (2013.01); *Y02T 10/642* (2013.01); *Y02T 10/7005* (2013.01); *Y02T 10/705* (2013.01); *Y02T 10/7077* (2013.01); *Y02T 10/7258* (2013.01)

(56) References Cited

FOREIGN PATENT DOCUMENTS

| | | |
|---|---|---|
| JP | 2013-005590 A | 1/2013 |
| WO | WO 2011/152763 A1 | 12/2011 |

\* cited by examiner

CONTROL DEVICE FOR ELECTRIC VEHICLE

CROSS-REFERENCE TO RELATED APPLICATION(S)

This application is based upon and claims the benefit of priority from prior Japanese patent application No. 2015-116944, filed on Jun. 9, 2015, the entire contents of which are incorporated herein by reference.

BACKGROUND

The present invention relates to a control device for an electric vehicle obtaining driving force from a traveling motor.

In recent years, a vehicle (EV) in which driving wheels are driven by a traveling motor or a hybrid vehicle in which driving force for the vehicle is obtained by a combination of a traveling motor and an engine has been developed and put into practical use. Not only a vehicle (HEV) in which a battery for supplying electric power to a traveling motor is charged by electric power generated by a generator driven by an engine, but also a vehicle (PHEV) in which a battery can be charged even by an external commercial use power supply have been developed and put into practical use as hybrid vehicles.

In the background art, a technique is available in which such an electric vehicle is made to travel in a limited traveling state in which the electric vehicle can travel with predetermined vehicle velocity or torque when there occurs an abnormality in an electrically driven system such as an abnormality in an electric equipment (a device such as a traveling motor or a battery, a control device, a communication device, etc.) or an abnormality in a communication system (for example, JP-A-2013-5590). The technique disclosed in JP-A-2013-5590 is a technique in which, when a drive instruction cannot be received from a control unit, torque limitation is reinforced stepwise to stop the vehicle. Thus, even if a drive instruction cannot be received from the control unit, it is possible to bring the vehicle into a safe state to avoid risk.

According to the technique disclosed in JP-A-2013-5590, since torque limitation is reinforced stepwise, the torque of the vehicle can be limited without giving an uncomfortable feeling to a driver. However, the torque limitation must be reinforced in a short time for some kind of abnormality or the like. In some traveling situation before the occurrence of the abnormality, reinforcement of torque limitation is not required for the traveling. In another case, no uncomfortable feeling is given to the driver even when torque is limited to a predetermined limited state. In other traveling conditions before the occurrence of the abnormality, an uncomfortable feeling may be given to the driver by torque limitation applied when a failure is detected.

SUMMARY

The present invention has been developed in consideration of the aforementioned circumstances. An object of the invention is to provide a control device for an electric vehicle, capable of controlling the traveling state amount of the vehicle in accordance with traveling situation before occurrence of an abnormality in an electrically driven system when the abnormality occurs.

In order to achieve the above object, acceding to the invention, there is provided a control device for an electric vehicle including a traveling motor which is configured to transmit a driving force to driving wheels, the control device comprising: a control unit having a suppression mode function for suppressing a traveling state amount of the vehicle when an abnormality occurs in an electrically driven system of the vehicle, wherein the suppression mode function includes a first suppression state and a second suppression state, and a suppression degree in the second suppression state is smaller than a suppression degree in the first suppression state, and in accordance with a kind of the abnormality in the electrically driven system, the control unit is configured to cause the vehicle to be in the first suppression state or is configured to cause the vehicle to be in the first suppression state after causing the vehicle to be in the second suppression state.

DETAILED DESCRIPTION OF EXEMPLARY EMBODIMENTS

Figure 1:
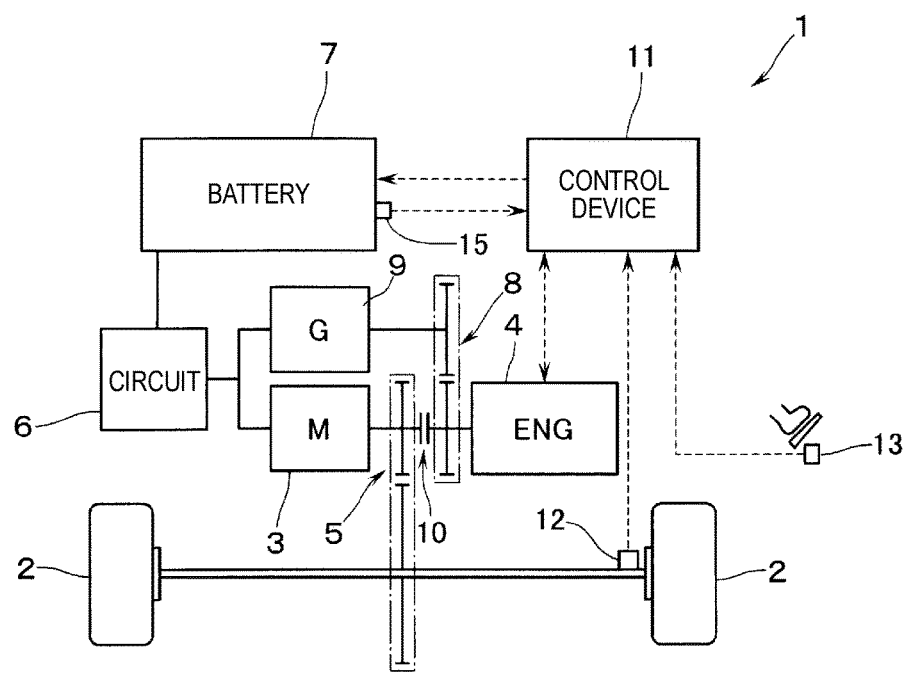
FIG. 1 is an overall schematic configuration diagram of an electric vehicle mounted with a control device according to an embodiment of the invention.

The overall configuration of an electric vehicle will be described with reference to FIG. 1. FIG. 1 shows the overall schematic configuration of an electric vehicle mounted with a control device according to an embodiment of the invention. The electric vehicle shown in FIG. 1 is an example in which the invention is applied to a hybrid vehicle using an electric motor and an engine together.

As shown in FIG. 1, the electric vehicle (hybrid vehicle or vehicle) 1 is provided with a traveling motor 3 for transmitting power to driving wheels 2, and an engine 4. The driving force of the traveling motor 3 is transmitted to the driving wheels 2 through a transmission mechanism 5. A battery 7 is connected to the traveling motor 3 through a circuit 6 such as an inverter. Electric power corresponding to pedal operation of a driver is supplied to the traveling motor 3 from the battery 7 through the circuit 6.

A generator 9 is connected to the engine 4 through an output system 8. The generator 9 is connected to the battery 7 (and the traveling motor 3) through the circuit 6. The output system 8 connected to the generator 9 is also connected to the transmission mechanism 5 through a clutch 10.

When the engine 4 is driven in accordance with the driving state of the vehicle 1, the driving force of the engine 4 is transmitted to the generator 9 through the output system 8. The generator 9 is rotated (driven) by the driving of the engine 4 so as to generate electric power. The electric power generated in the generator 9 is supplied to the battery 7 and the traveling motor 3. When the output system 8 and the transmission mechanism 5 are connected by the clutch 10 in accordance with the driving state of the vehicle 1, the driving force of the engine 4 is transmitted to the generator 9 and the driving wheels 2.

A control device 11 for controlling various devices generally is provided in the vehicle 1. Information of rotational speed of the engine 4 and information of a vehicle velocity sensor 12 are inputted to the control device 11. The battery 7 is provided with a temperature sensor 15 for detecting the temperature state of the battery 7. Information of the temperature sensor 15 is inputted to the control device 11. In addition, an accelerator position sensor (APS) 13 is provided in the vehicle 1. Detection information (information of required torque) of the APS 13 is inputted to the control device 11. In addition, information of the clutch 10, information of the circuit 6, information of the traveling motor 3, information of cooling systems for the traveling motor 3, the circuit 6 and the generator 9 are inputted to the control device 11.

The control device 11 includes a so-called ECU (Electronic Control Unit), and the ECU is formed as an LSI device in which a CPU (microprocessor), an ROM, an RAM, etc. are integrated, or as an embedded electronic device. The ECU is provided with control programs as software in order to perform various kinds of control including motor control and perform various kinds of control so that the vehicle operates safely and smoothly.

The vehicle 1 configured thus has an EV mode using the traveling motor 3 as a power source for driving the vehicle and a series mode using the traveling motor 3 as a power source for driving the vehicle and using the engine 4 as a power source for the generator 9. The vehicle 1 further has a parallel mode using the traveling motor 3 and the engine 4 as power sources for driving the vehicle. Those operation modes are changed over from one to another suitably in accordance with the traveling state of the vehicle 1.

The control device for the electric vehicle according to the embodiment of the invention has a suppression mode function for driving the vehicle 1 while suppressing the traveling state amount of the vehicle 1 (limiting at least one of the vehicle velocity and the torque gain) when an abnormality is determined in an electrically driven system based on the information of the temperature sensor 15, the information of the clutch 10, the information of the circuit 6, the information of the traveling motor 3 and the information of the cooling systems.

The traveling state amount of the vehicle 1 which is controlled in the invention is at least one parameter related to the traveling of the vehicle 1.

Specifically, the control device has a suppression mode function including a limp home mode and a pre-limp home mode. In the limp home mode, the traveling state amount of the vehicle 1 is suppressed (at least one of the vehicle velocity and the torque gain is limited) to cause the vehicle 1 to be in a first suppression state. In the pre-limp home mode, the traveling state amount of the vehicle 1 is suppressed (at least one of the vehicle velocity and the torque gain is limited) to cause the vehicle 1 to be in a second suppression state in which the suppression of the traveling state amount is relaxed as compared with that in the first suppression state. Namely, the suppression of the traveling state amount of the vehicle 1 in the limp home mode is greater than the suppression of the traveling state amount of the vehicle 1 in the pre-limp home mode. As the suppression mode function, a plurality of functions are set in accordance with kinds of abnormalities in the electrically driven system. The suppression of the traveling state amount means decreasing the vehicle velocity or the torque gain. As the suppression of the traveling state amount is greater, the vehicle velocity or the torque gain is smaller.

As will be described in detail later, when an abnormality occurs in the electrically driven system, a target vehicle velocity (vehicle velocity to be limited) is set at a vehicle velocity (for example, 50 km/h) in the limp home mode. When an actual vehicle velocity is, for example, 100 km/h, the difference between the actual vehicle velocity and the target vehicle velocity is 50 km/h. In this case, due to the large difference in vehicle velocity, the vehicle velocity will be decreased from 100 km/h to 50 km/h suddenly in a short time if the vehicle velocity is limited in the limp home mode. Thus, an uncomfortable feeling will be given to the driver. Therefore, in some kind of abnormality in the electrically driven system, the vehicle velocity is limited in the pre-limp home mode before the vehicle velocity is limited in the limp home mode.

The vehicle velocity in the pre-limp home mode is, for example, set at 70 km/h. The vehicle velocity is once decreased from 100 km/h to 70 km/h, and then decreased to 50 km/h, which is the vehicle velocity in the limp home mode. In addition, torque may be applied to the traveling state amount. In the pre-limp home mode, in accordance with the difference in torque gain, the torque gain is set at a torque gain (for example, 0.6) relaxed as compared with a torque gain (for example, 0.3) in the limp home mode.

For example, when the actual vehicle velocity is 60 km/h slightly faster than the target vehicle velocity, the difference between the actual vehicle velocity and the target vehicle velocity is 10 km/h. In this case, the vehicle velocity will not be decreased suddenly even if the vehicle velocity is decreased from 60 km/h to 50 km/h in a short time. There is no fear that an uncomfortable feeling may be given to the driver. Therefore, the vehicle velocity is limited in the limp home mode without execution of the pre-limp home mode.

In this manner, the vehicle velocity or the torque gain of the vehicle 1 can be limited based on the traveling situation (traveling state amount including at least one of vehicle velocity and torque) of the vehicle 1 before the occurrence of the abnormality in the electrically driven system. Thus, suppression of traveling can be controlled properly without making control time lengthy.

Control for limiting at least one of the vehicle velocity and the torque gain (traveling state amount) by means of the control device according to the embodiment of the invention will be described specifically with reference to FIG. 2 to FIG. 6.

Figure 2:
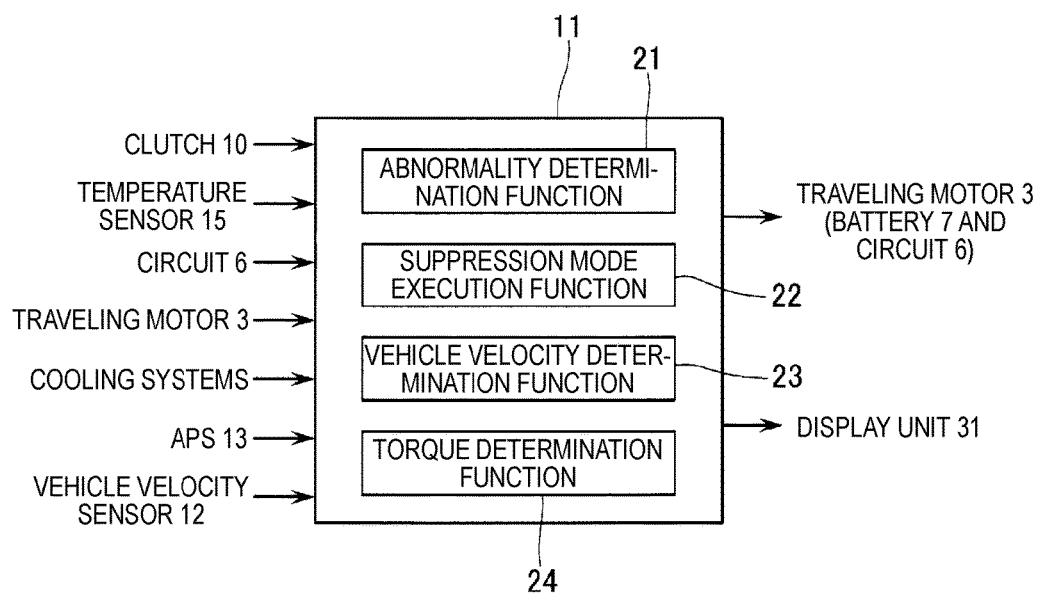
FIG. 2 is a block configuration diagram of a control unit.
Figure 3:
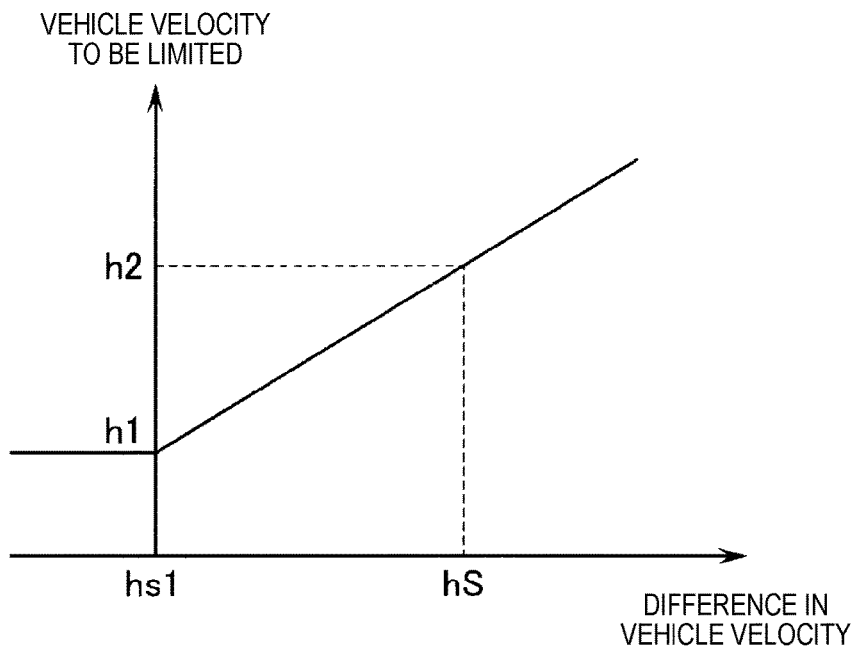
FIG. 3 is a map for explaining suppression of vehicle velocity.
Figure 4:
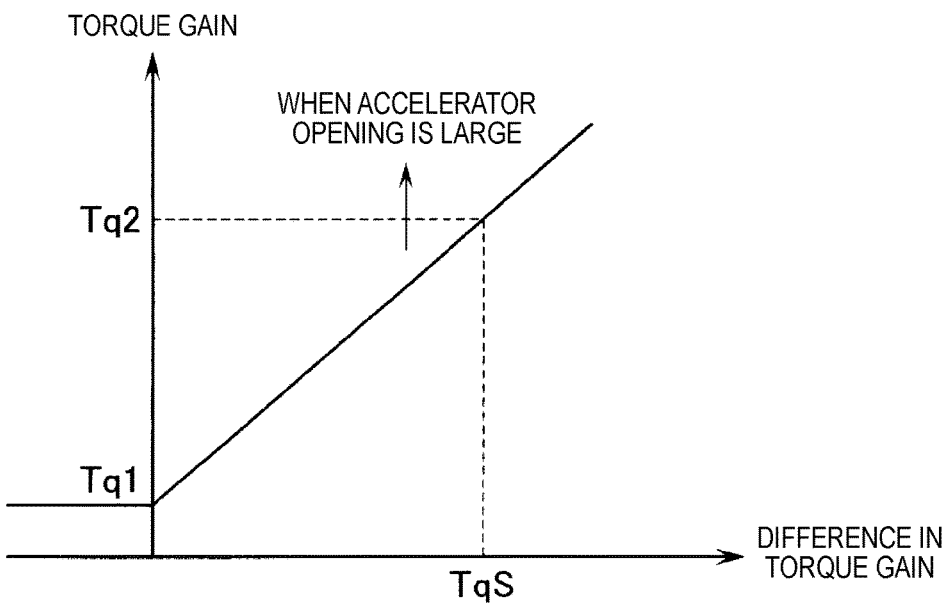
FIG. 4 is a map for explaining suppression of torque.
Figure 5:
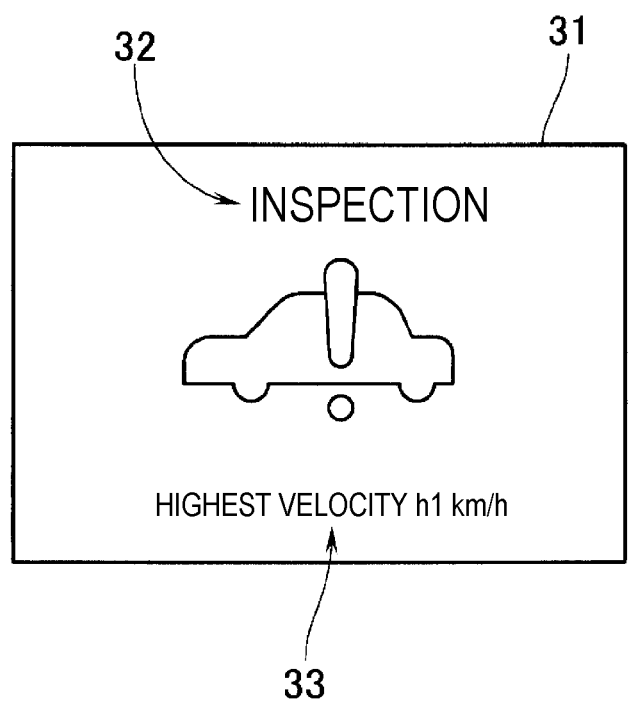
FIG. 5 is a view for explaining an example of display when an abnormality occurs.
Figure 6:
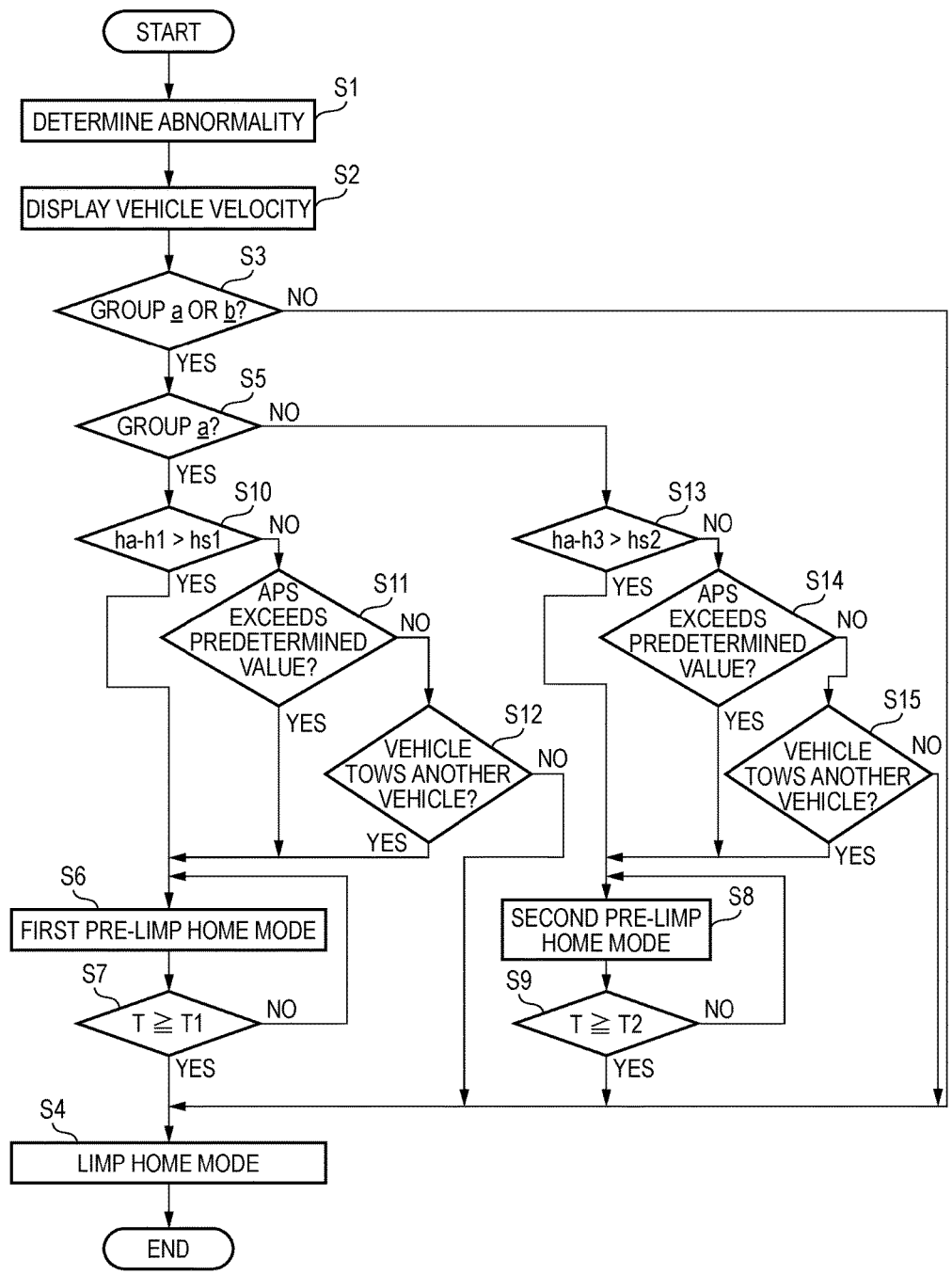
FIG. 6 is a flow chart of control for suppressing a traveling state amount.

FIG. 2 shows the block configuration of a control unit according to the embodiment of the invention. FIG. 3 shows a map for explaining the relationship between a difference between a target vehicle velocity and an actual vehicle velocity and a vehicle velocity to be limited. FIG. 4 shows a map for explaining the relationship between a difference between a target torque gain and an actual torque gain and a torque gain to be limited. FIG. 5 shows an example of display when an abnormality occurs in the electrically driven system. FIG. 6 shows a flow chart of control for suppressing at least one of the vehicle velocity and the torque (traveling state amount).

As shown in FIG. 2, the information of the temperature sensor 15, the information of the clutch 10, the information of the circuit 6, the information of the traveling motor 3 and the information of the cooling systems are inputted to the control device 11. An abnormality determination function 21 is provided in the control device 11 so as to make determination as to abnormality in the electrically driven system based on the inputted information. When the determination about abnormality is carried out, the determination is divided into a plurality of groups in accordance with kinds of abnormalities in the electrically driven system. For example, in the case of the embodiment, in accordance with kinds of abnormalities in the electrically driven system, the determination is divided into a group a of abnormalities for which limitation should be reinforced gradually, a group b of abnormalities for which limitation should be reinforced gradually in a short time, and a group c of abnormalities for which limitation should be reinforced immediately.

In addition, a suppression mode execution function 22 is provided in the control device 11. The suppression mode execution function 22 has a function in which, when a predetermined condition is satisfied at the time of an abnormality belonging to the group a, a first pre-limp home mode is executed for a first predetermined time T1, and a limp home mode is then executed. The suppression mode execution function 22 has a function in which, when a predetermined condition is satisfied at the time of an abnormality belonging to the group b, a second pre-limp home mode is executed for a second predetermined time T2 shorter than the first predetermined time T1, and the limp home mode is then executed. The suppression mode execution function 22 has a function in which the limp home mode is executed without execution of any pre-limp home mode when the predetermined condition is not satisfied at the time of the abnormality belonging to the group a or the group b or when there occurs an abnormality belonging to the group c.

As described above, the suppression mode function includes functions for the group a, the group b and the group c respectively so that the first pre-limp home mode and the limp home mode, the second pre-limp home mode and the limp home mode, and the limp home mode can be set for an abnormality belonging to the group a, an abnormality belonging to the group b, and an abnormality belonging to the group c respectively. That is, as the suppression mode function, a plurality of functions are set in accordance with kinds of abnormalities in the electrically driven system.

For example, each group may include the following kinds of abnormalities.

Group a: Abnormalities in the clutch 10, and abnormalities in the battery 7

Group b: Abnormalities in the circuit 6 (high voltage circuit), and abnormalities in the traveling motor 3

Group c: Abnormalities in the cooling systems for the battery and the electric system (the traveling motor 3, circuit 6 and generator 9)

In addition, the information of the vehicle velocity sensor 12 and the information of the APS 13 are inputted to the control device 11. A vehicle velocity determination function 23 and a torque determination function 24 are provided in the control device 11. The vehicle velocity determination function 23 has a function of recognizing an actual vehicle velocity, a target vehicle velocity and a difference between the actual vehicle velocity and the target vehicle velocity, and setting a vehicle velocity to be limited. The torque determination function 24 has a function of recognizing an actual torque gain, a target torque gain and a difference between the actual torque gain and the target torque gain, and setting a torque gain to be limited.

An instruction is outputted from the control device 11 to the traveling motor 3 (the battery 7 and the circuit 6) in order to limit the vehicle velocity and the torque to those in the limp home mode or the pre-limp home mode to thereby suppress the traveling of the vehicle 1. In addition, an instruction for display is outputted to a display unit 31 (see FIG. 5 that will be described later).

As shown in FIG. 3, a vehicle velocity h1 in the limp home mode when an abnormality occurs in the electrically driven system is, for example, set at 50 km/h. The target vehicle velocity is set as h1 (for example, 50 km/h), which is the vehicle velocity in the limp home mode. When the difference between the target vehicle velocity and the actual vehicle velocity exceeds a predetermined value hs1, a vehicle velocity in the pre-limp home mode is set in accordance with the difference between the actual vehicle velocity and the target vehicle velocity. That is, when the actual vehicle velocity is, for example, 100 km/h, the difference between the actual vehicle velocity and the target vehicle velocity is hS (50 km/h). When the difference between the actual vehicle velocity and the target vehicle velocity is hS, the vehicle velocity in the pre-limp home mode is set at h2 (for example, 70 km/h) higher than h1 (to relax the suppression).

In the case where an abnormality occurs in the electrically driven system, the pre-limp home mode is executed when the difference between the actual vehicle velocity and the target vehicle velocity exceeds the predetermined value hs1. On the other hand, when the difference between the actual vehicle velocity and the target vehicle velocity is not higher than the predetermined value hs1, a torque gain to be limited is set in accordance with an accelerator opening as shown in FIG. 4. Incidentally, even when the difference between the actual vehicle velocity and the target vehicle velocity exceeds the predetermined value hs1, the torque gain to be limited may be set in accordance with the accelerator opening.

As shown in FIG. 4, a torque gain Tq1 in the limp home mode when an abnormality occurs in the electrically driven system is, for example, set at 0.3. A target torque gain is set as a torque gain Tq1 (for example, 0.3) in the limp home mode. When an actual torque gain is 1.0, the difference (torque gain difference) between the actual torque gain and the target torque gain is TqS (0.7). In the pre-limp home mode, a torque gain is set at Tq2 (for example, 0.6) to relax the suppression when the torque gain difference is TqS.

Incidentally, the relationship between the torque gain difference and the torque gain to be limited is set in accordance with the accelerator opening. For example, when the accelerator opening is large (the accelerator is stepped down deeply), a line designating the relationship between the torque gain difference and the torque gain to be limited is set to be shifted upward. That is, the line is set within the width of a predetermined range of the accelerator opening. That is, the torque gain to be limited is set at a different value in accordance with the accelerator opening in spite of the same torque gain difference.

As shown in FIG. 3 and FIG. 4, as the above difference in the vehicle velocity or the torque gain is smaller, the vehicle velocity or the torque gain in the pre-limp home mode is set to be gradually closer to the vehicle velocity or the torque gain in the limp home mode.

When an abnormality occurs in the electrically driven system, the occurrence of the abnormality is displayed on the display unit 31, for example, in a portion where meters are disposed. That is, as shown in FIG. 5, when an abnormality occurs, a display 32 of inspection time is displayed at a position of a vehicle symbol on the display unit 31. A display 33 indicating h1 km/h as highest velocity is displayed under the position of the vehicle design as information about vehicle velocity to be limited. In this manner, the drive can visually recognize that the traveling velocity has been limited due to an abnormality. Thus, an uncomfortable feeling of the driver can be suppressed.

The operation of limiting the vehicle velocity or the torque when an abnormality occurs will be described specifically with reference to FIG. 6.

As shown in FIG. 6, when an abnormality occurs, the abnormality is determined in Step S1. A vehicle velocity in the limp home mode is displayed on the display unit 31 in Step S2. In Step S3, it is determined whether the kind of abnormality in the electrically driven system is an abnormality belonging to the group a or an abnormality belonging to the group b, or not. When it is determined in Step S3 that the abnormality is not an abnormality belonging to the group a or an abnormality belonging to the group b, that is, when it is determined that the abnormality is an abnormality belonging to the group c, for example, when it is an abnormality in a cooling system, the limp home mode is executed immediately without execution of the pre-limp home mode. The processing is then terminated. That is, the processing moves to Step S4 to execute the limp home mode, and is then terminated.

In the limp home mode, the vehicle velocity is, for example, set at 50 km/h, while the torque gain is, for example, set at 0.3. The traveling of the vehicle 1 is suppressed to attain the vehicle velocity to be limited and the torque gain to be limited. Thus, the vehicle 1 can be moved and stopped safely in spite of the abnormality belonging to the group c.

When it is determined in Step S3 that the abnormality is an abnormality belonging to the group a or an abnormality belonging to the group b, whether the kind of abnormality in the electrically driven system is an abnormality belonging to the group a or not is determined in Step S5. When it is determined in Step S5 that the abnormality is an abnormality belonging to the group a, for example, when an abnormality in the clutch 10 or a low temperature abnormality in the battery 7 is determined as the abnormality belonging to the group a, the processing moves to a routine for executing a first pre-limp home mode in Step S6 (which will be described in detail later).

After the first pre-limp home mode is executed in Step S6, whether a time T in which the first pre-limp home mode is executed is equal to or longer than a first predetermined time T1 is determined in Step S7. When it is determined in Step S7 that the time T in which the first pre-limp home mode is executed is less than the first predetermined time T1, the processing returns to Step S6 to continue the execution of the first pre-limp home mode.

When it is determined in Step S5 that the kind of abnormality in the electrically driven system is not an abnormality belonging to the group a, that is, when it is determined that the kind of abnormality in the electrically driven system is an abnormality belonging to the group b, for example, when an abnormality in the circuit 6 (high voltage circuit) or an abnormality in the traveling motor 3 is determined as the abnormality belonging to the group b, the processing moves to a routine for executing a second pre-limp home mode in Step S8 (which will be described in detail later). The routine for executing the second pre-limp home mode in Step S8 has the same processing contents as the routine for executing the first pre-limp home mode in Step S6.

After the second pre-limp home mode is executed in Step S8, whether a time T in which the second pre-limp home mode is executed is equal to or greater than a second predetermined time T2 shorter than the first predetermined time T1 is determined in Step S9. When it is determined in Step S9 that the time T in which the second pre-limp home mode is executed is less than the second predetermined time T2, the processing returns to Step S8 to continue the execution of the second pre-limp home mode.

When it is determined in Step S7 that the time T in which the first pre-limp home mode is executed is equal to or longer than the first predetermined time T1, or when it is determined in Step S9 that the time T in which the second pre-limp home mode is executed is equal to or longer than the second predetermined time T2, the processing moves to Step S4 to execute the limp home mode. The processing is then terminated.

In this manner, when there occurs an abnormality belonging to the group a or an abnormality belonging to the group b, the first or second pre-limp home mode is executed for the predetermined time T1 or the predetermined time T2 (T1>T2), and the limp home mode is then executed after the predetermined time has passed. Therefore, the first or second pre-limp home mode can be executed for a suitable time in accordance with the kind of abnormality.

The routine for determining whether to execute the first pre-limp home mode or the second pre-limp mode will be described specifically.

When the abnormality belongs to the group a or the group b, whether a difference between an actual vehicle velocity ha and a target vehicle velocity h1 or a target vehicle velocity h3 exceeds a predetermined value hs1 or a predetermined value hs2 or not is determined in Step S10 or Step S13. When it is determined in Step S10 or Step S13 that the difference between the actual vehicle velocity ha and the target vehicle velocity h1 or the target vehicle velocity h3 exceeds the predetermined value hs1 or the predetermined value hs2, the first pre-limp home mode or the second pre-limp home mode is executed in Step S6 or Step S8. That is, a vehicle velocity to be limited is set in accordance with the difference between the actual vehicle velocity ha and the target vehicle velocity h1 or the target vehicle velocity h3 based on the map shown in FIG. 3. The first or second pre-limp home mode in which the traveling of the vehicle 1 is suppressed by the set vehicle velocity is executed.

When it is determined in Step S10 or Step S13 that the difference between the actual vehicle velocity ha and the target vehicle velocity h1 or the target vehicle velocity h3 does not exceed the predetermined value hs1 or the predetermined value hs2, that is, when it is determined that the difference is not higher than the predetermined value hs1 or the predetermined value hs2, whether a detection value (accelerator opening) of the APS exceeds a predetermined value or not is determined in Step S11 or Step S14. When it is determined in Step S11 or Step S14 that the accelerator opening exceeds the predetermined value, it is determined that the difference between the actual vehicle velocity ha and the target vehicle velocity h1 or the target vehicle velocity h3 is small but the accelerator has been stepped down. Thus, the first pre-limp home mode or the second pre-limp home mode is executed in Step S6 or Step S8. That is, a torque gain is set in accordance with the difference between the actual torque gain and the target torque gain based on the map shown in FIG. 4. The first or second pre-limp home mode in which the traveling of the vehicle 1 is suppressed by the set torque gain is executed.

Assume that it is determined in Step S11 or Step S14 that the detection value (accelerator opening) of the APS does not exceed the predetermined value. That is, when there occurs an abnormality for which the first pre-limp home mode or the second pre-limp home mode should be executed, assume that it is determined that the difference between the actual vehicle velocity ha and the target vehicle velocity h1 or the target vehicle velocity h3 is small but the accelerator is not stepped down. In this case, for example, whether the vehicle 1 tows another vehicle or not is determined in Step S12 or Step S15. The determination as to whether the vehicle 1 tows another vehicle or not is carried out by a mechanical signal from a switch, for example.

When it is determined in Step S12 or Step S15 that the vehicle 1 tows another vehicle, the first pre-limp home mode or the second pre-limp home mode is executed in Step S6 or Step S8. When it is determined in Step S12 or Step S15 that the vehicle 1 does not tow another vehicle, the first pre-limp home mode or the second pre-limp home mode is not executed, but the limp home mode is executed immediately. The processing is then terminated.

Thus, the first pre-limp home mode or the second pre-limp home mode is executed in accordance with the difference between the actual vehicle velocity ha and the target vehicle velocity h1 or the target vehicle velocity h3 or in accordance with the difference between the actual torque gain and the target torque gain corresponding to the accelerator opening. Accordingly, the first pre-limp home mode or the second pre-limp home mode can be executed in suitable limitation condition (vehicle velocity or torque gain) in accordance with the traveling situation before the occurrence of the abnormality.

In addition, when there occurs an abnormality for which the first pre-limp home mode or the second pre-limp home mode should be executed, the difference between the actual vehicle velocity ha and the target vehicle velocity h1 or the target vehicle velocity h3 or the difference between the actual torque gain and the target torque gain corresponding to the accelerator opening is small enough to satisfy the conditions on which the mode should be shifted to the limp home mode. Even in such a case, the first pre-limp home mode or the second pre-limp home mode can be executed if the vehicle 1 tows another vehicle, for example.

As has been described above, in the control device for the electric vehicle according to the embodiment, when there occurs an abnormality in the electrically driven system, a vehicle velocity or a torque gain is set to suppress the traveling of the vehicle 1 based on the traveling situation (vehicle velocity or torque) of the vehicle before the occurrence of the abnormality in the electrically driven system. As a result, when the abnormality occurs in the electrically driven system, the traveling of the vehicle 1 can be limited properly without making the control time lengthy.

In the invention, there is provided a control device for an electric vehicle including a traveling motor which is configured to transmit a driving force to driving wheels, the control device including a control unit having a suppression mode function for suppressing a traveling state amount of the vehicle when an abnormality occurs in an electrically driven system of the vehicle, in which the suppression mode function includes a first suppression state and a second suppression state, and a suppression degree in the second suppression state is smaller than a suppression degree in the first suppression state, and, in accordance with a kind of the abnormality in the electrically driven system, the control unit is configured to cause the vehicle to be in the first suppression state or is configured to cause the vehicle to be in the first suppression state after causing the vehicle to be in the second suppression state.

According to the above configuration, the suppression in the second suppression state (suppression in a pre-limp home mode) can be executed before suppression in the first suppression state (suppression in a limp home mode). The suppression degree of the traveling state amount in the second suppression state is relaxed as compared with that in the first suppression state. For some kind of abnormality in the electrically driven system, the vehicle is caused to be in the first suppression state after the vehicle is caused to be in the second suppression state. For another kind of abnormality, the vehicle is caused to be only in the first suppression state. In this manner, the traveling state amount of the vehicle can be suppressed based on the traveling state amount before the occurrence of the abnormality. Thus, traveling limitation can be controlled properly without making control time lengthy.

The control unit may be configured to set the traveling state amount in the second suppression state in accordance with a difference between the traveling state amount in the first suppression state and a current traveling state amount of the vehicle.

In the above case, the traveling state amount in the second suppression state is set in accordance with a difference between the traveling state amount in the first suppression state and a current traveling state amount. Thus, when the vehicle travels with a traveling state amount relaxed as compared with that in the first suppression state, the traveling state amount in the second suppression state is set in accordance with the difference in the traveling state amount, so that the traveling state amount can be suppressed without greatly deviating from the current traveling state amount.

For example, when the vehicle velocity is applied to the traveling state amount as will be described later, the traveling state amount in the first suppression state is set at a vehicle velocity (for example, 50 km/h) in the first suppression state. When an actual vehicle velocity is 100 km/h, the difference of the traveling state amount is 50 km/h. A vehicle velocity in the second suppression state is, for example, set at 70 km/h. Thus, the traveling of the vehicle is suppressed in a state where the vehicle velocity is limited to 70 km/h. After that, the traveling of the vehicle is suppressed in a state where the vehicle velocity is limited to 50 km/h, which is the vehicle velocity in the first suppression state. When a torque is applied to the traveling state amount as will be described later, a torque gain is set in accordance with the torque gain difference. In the second suppression state, the torque gain is set at a torque gain (for example, 0.6) relaxed as compared with a torque gain (for example, 0.3) in the first suppression state.

The control unit may be configured to the traveling state amount in the second suppression state closer to the traveling state amount in the first suppression state as the difference between the traveling state amount in the first suppression state and the current traveling state amount is smaller.

In the above case, the traveling state amount in the second suppression state can be made gradually closer to the traveling state amount in the first suppression state as the difference of the traveling state amount is smaller.

The control unit may be configured to cause the vehicle to be in the first suppression state when a time in which the control unit causes the vehicle to be in the second suppression state is equal to or longer than a predetermined time.

In the above case, since the vehicle is caused to be in the first suppression state when the time in which the vehicle is caused to be in the second suppression state is equal to or longer than the predetermined time, suppression without any uncomfortable feeling can be performed properly.

The second suppression state may include a plurality of modes, which are different from each other in suppression time in accordance with kinds of the abnormality in the electrically driven system.

In the above case, as the second suppression state, a plurality of modes are set to be different from each other in suppression time in accordance with kinds of abnormalities in the electrically driven system. Thus, traveling of the vehicle can be suppressed more properly in accordance with each kind of abnormality.

The traveling state amount of the vehicle may include at least one of a traveling velocity of the vehicle and a torque of the vehicle.

In the above case, the traveling of the vehicle can be suppressed by limitation of at least one of a traveling velocity (vehicle velocity) of the vehicle and a torque (torque gain) of the vehicle.

When the kind of the abnormality is an abnormality in at least one of cooling systems for a battery and an electric system, the control unit may be configured to cause the vehicle to be in the first suppression state, and, when the kind of the abnormality is not an abnormality in the at least one of cooling systems, the control unit may be configured to cause the vehicle to be in the first suppression state after causing the vehicle to be in the second suppression state.

When the kind of the abnormality is the abnormality in at least one of cooling systems for the battery and the electric system, the traveling state amount is suppressed so that the vehicle is caused to be in the first suppression state, and, when the kind of the abnormality is not the abnormality in the at least one of cooling systems, the traveling state amount is suppressed so that the vehicle is caused to be in the first suppression state after the vehicle is caused to be in the second suppression state. Thus, the traveling state amount of the vehicle can be suppressed more properly when the abnormality occurs in the cooling systems.

In a control device for an electric vehicle according to the invention, when an abnormality occurs in an electrically driven system, the traveling state amount of the vehicle can be suppressed in accordance with the traveling situation before the occurrence of the abnormality.

The invention can be used in the industrial field of control devices for electric vehicles.

What is claimed is:

1. A control device for an electric vehicle including a traveling motor which is configured to transmit a driving force to driving wheels, the control device comprising:
   a control unit having a suppression mode function for suppressing a traveling state amount of the vehicle when an abnormality occurs in an electrically driven system of the vehicle, wherein
   the suppression mode function includes a first suppression state and a second suppression state, and a suppression degree in the second suppression state is smaller than a suppression degree in the first suppression state,
   in accordance with a kind of the abnormality in the electrically driven system, the control unit is configured to cause the vehicle to be in the first suppression state or is configured to cause the vehicle to be in the first suppression state after causing the vehicle to be in the second suppression state, and
   the control unit is configured to set the traveling state amount in the second suppression state in accordance with a difference between the traveling state amount in the first suppression state and a current traveling state amount of the vehicle, such that the traveling state amount in the second suppression state progressively increases as the difference increases and progressively decreases as the difference decreases.

2. The control device according to claim 1, wherein
   the control unit is configured to make the traveling state amount in the second suppression state closer to the traveling state amount in the first suppression state as the difference between the traveling state amount in the first suppression state and the current traveling state amount is smaller.

3. The control device according to claim 1, wherein
   the control unit is configured to cause the vehicle to be in the first suppression state when a time in which the control unit causes the vehicle to be in the second suppression state is equal to or longer than a predetermined time.

4. The control device according to claim 1, wherein
   the second suppression state includes a plurality of modes, which are different from each other in suppression time in accordance with kinds of the abnormality in the electrically driven system.

5. The control device according to claim 1, wherein
   the traveling state amount of the vehicle includes at least one of a traveling velocity of the vehicle and a torque of the vehicle.

6. The control device according to claim 1, wherein
   when the kind of the abnormality is an abnormality in at least one of cooling systems for a battery and an electric system, the control unit is configured to cause the vehicle to be in the first suppression state, and
   when the kind of the abnormality is not an abnormality in the at least one of cooling systems, the control unit is configured to cause the vehicle to be in the first suppression state after causing the vehicle to be in the second suppression state.

7. A control device for an electric vehicle including a traveling motor which is configured to transmit a driving force to driving wheels, the control device comprising:
   a control unit having a suppression mode function for suppressing a traveling state amount of the vehicle when an abnormality occurs in an electrically driven system of the vehicle, wherein
   the suppression mode function includes a first suppression state and a second suppression state, and a suppression degree in the second suppression state is smaller than a suppression degree in the first suppression state,
   in accordance with a kind of the abnormality in the electrically driven system, the control unit is configured to cause the vehicle to be in the first suppression state or is configured to cause the vehicle to be in the first suppression state after causing the vehicle to be in the second suppression state,
   the control unit is configured to set the traveling state amount in the second suppression state in accordance with a difference between the traveling state amount in the first suppression state and a current traveling state amount of the vehicle, and
   the second suppression state includes a plurality of modes in accordance with kinds of the abnormality in the electrically driven system,
   one of the plurality of modes, selected based on one kind of abnormality, is maintained for a first predetermined period of time,
   another one of the plurality of modes, selected based on another kind of abnormality, is maintained for a second predetermined period of time shorter than the first predetermined period of time, and
   the first suppression state is executed after the first or second predetermined period of time has elapsed.

* * * * *